United States Patent
Bhattad et al.

(10) Patent No.: US 11,223,277 B2
(45) Date of Patent: Jan. 11, 2022

(54) POWER CONVERTER WITH A HIGH CONVERSION RATIO

(71) Applicant: Dialog Semiconductor (UK) Limited, London (GB)

(72) Inventors: Ambreesh Bhattad, Swindon (GB); Horst Knoedgen, Munich (DE); James T. Doyle, Pheonix, AZ (US); Milan Dragojevic, West Roxbury, MA (US)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/568,803

(22) Filed: Sep. 12, 2019

(65) Prior Publication Data

US 2021/0083582 A1    Mar. 18, 2021

(51) Int. Cl.
*H02M 3/07*    (2006.01)
*H02M 3/158*   (2006.01)
*H02M 1/00*    (2006.01)

(52) U.S. Cl.
CPC ........... *H02M 3/07* (2013.01); *H02M 3/1584* (2013.01); *H02M 2001/0058* (2013.01); *H02M 2003/1586* (2013.01)

(58) Field of Classification Search
CPC ....... H02M 3/156; H02M 3/158–1588; H02M 3/07; H02M 2001/0058; H02M 2003/1586
See application file for complete search history.

(56) References Cited

U.S. PATENT DOCUMENTS

| | | | | |
|---|---|---|---|---|
| 2009/0115341 A1* | 5/2009 | Nijhof | ............... | H05B 41/2881 315/246 |
| 2010/0289423 A1* | 11/2010 | Yao | ...................... | H02M 3/1582 315/246 |
| 2014/0375225 A1* | 12/2014 | Knoedgen | ............... | H02M 1/08 315/200 R |
| 2015/0194882 A1* | 7/2015 | Ihs | ........................ | H02M 3/156 323/272 |
| 2017/0126146 A1* | 5/2017 | Petersen | ............... | H02M 3/156 |
| 2017/0163157 A1* | 6/2017 | Petersen | ................. | H02M 1/14 |
| 2017/0271990 A1* | 9/2017 | Knoedgen | ............. | H02M 1/096 |

* cited by examiner

*Primary Examiner* — Rafael O De Leon Domenech
(74) *Attorney, Agent, or Firm* — Saile Ackerman LLC; Stephen B. Ackerman (57) ABSTRACT

The present document describes a power converter configured to provide energy at an output based on energy provided at an input. The power converter comprises a first switch, wherein a first node is coupled to the input and wherein a second node is coupled to an intermediate point, a second switch, wherein a first node is coupled to the intermediate point and wherein a second node is coupled to an inductor point, a capacitor, wherein a first node of the capacitor is coupled to the intermediate point, a first diode element, wherein a first node is coupled to a second node of the capacitor and wherein a second node is coupled to the inductor point, a second diode element, wherein a first node is coupled to a reference port, and wherein a second node is coupled to the second node of the capacitor; and an inductor, wherein a first node is coupled to the inductor point and wherein a second node is coupled to the output.

18 Claims, 6 Drawing Sheets

POWER CONVERTER WITH A HIGH CONVERSION RATIO

TECHNICAL FIELD

The present document relates to DC/DC power converters. In particular, the present document relates to power converters providing a relatively high voltage conversion ratio. In particular, the present document relates to a resonant power converter with high conversion ratio.

BACKGROUND

A DC/DC power converter is configured to convert electrical power at a DC (direct current) input voltage into electrical power at a DC output voltage. Various different techniques may be used for achieving relatively high conversion ratios between the input voltage and the output voltage, such as multi-level converters, transformer step-down converters, multi-stage converters, a cascade of converters, etc. These techniques are relatively complex with regards to the number and/or the size of external components, with regards to electromagnetic interference (EMI) requirements, with regards to PCB (printed circuit board) size, and/or with regards to timing control of the one or more switches of the power converter, notably for relatively low load currents to be provided at the output of the power converter.

SUMMARY

The present document addresses the technical problem of providing an efficient power converter for relatively high voltage conversion ratios, notably in case of relatively low load currents.

According to an aspect, a power converter (notably a step-down converter) configured to provide electrical energy or power at an output port based on electrical energy or power provided at an input port. The power converter comprises a first switch, wherein a first node of the first switch is coupled to the input port and wherein a second node of the first switch is coupled to an intermediate point. Furthermore, the power converter comprises a second switch, wherein a first node of the second switch is coupled to the intermediate point and wherein a second node of the second switch is coupled to an inductor point. In addition, the power converter comprises a capacitor, wherein a first node of the capacitor is coupled to the intermediate point. The power converter also comprises a first diode element, wherein a first node of the first diode element is coupled to a second node of the capacitor and wherein a second node of the first diode element is coupled to the inductor point. In addition, the power converter comprises a second diode element, wherein a first node of the second diode element is coupled to a reference port, and wherein a second node of the second diode element is coupled to the second node of the capacitor. Furthermore, the power converter comprises an inductor, wherein a first node of the inductor is coupled to the inductor point and wherein a second node of the inductor is coupled to the output port. In a preferred example, a diode element is implemented as an active diode and/or as a switch (notably using a transistor). Hence the term "diode element" may be understood as representing an active diode and/or as being a switch. A diode element (notably a diode), if replaced by a synchronous FET switch, may make use of an asymmetric device for smaller area, faster switching and improved efficiency. Hence, a diode element may be or may comprise a passive diode (e.g. a Schottky diode), an active diode and/or a switch.

According to another aspect, a power converter (notably a step-up converter) configured to provide energy at an output port based on energy provided at an input port is described. The power converter comprises a first switch, wherein a first node (e.g. the source of drain) of the first switch is coupled to the input port and wherein a second node (e.g. the drain or source) of the first switch is coupled to an intermediate point. Furthermore, the power converter comprises a second switch, wherein a first node (e.g. the source or drain) of the second switch is coupled to the intermediate point and wherein a second node (e.g. the drain or source) of the second switch is coupled to a reference port. The power converter also comprises a capacitor, wherein a first node of the capacitor is coupled to the intermediate point. Furthermore, the power converter comprises a first diode element, wherein a first node of the first diode element is coupled to the input port and wherein a second node of the first diode element is coupled to the inductor point. The power converter also comprises a second diode element, wherein a first node of the second diode element is coupled to the inductor point, and wherein a second node of the second diode element is coupled to the output port. In addition, the power converter comprises an inductor, wherein a first node of the inductor is coupled to a second node of the capacitor and wherein a second node of the inductor is coupled to the inductor point.

According to a further aspect, a method for operating a power converter is described. The method comprises operating the power converter in different operation states to provide power at the output port of the power converter.

A method comprises a first operation state of the power converter, closing a first switch, which is arranged between the input port and a capacitor of the power converter, to at least partially charge the capacitor. Furthermore, the method may comprise, in the first operation state, opening the second switch, which is arranged between the capacitor and an inductor of the power converter, wherein the inductor is coupled to the output port, to decouple the capacitor from the output port.

In addition, the method may comprise a subsequent second operation state of the power converter, opening the first switch to decouple the capacitor from the input port, and closing the second switch to at least partially discharge the capacitor via the inductor to the output port.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings.

DETAILED DESCRIPTION

As outlined above, the present document is directed at providing an efficient power converter, which is configured to provide relatively high voltage conversion ratios.

Figure 1A:
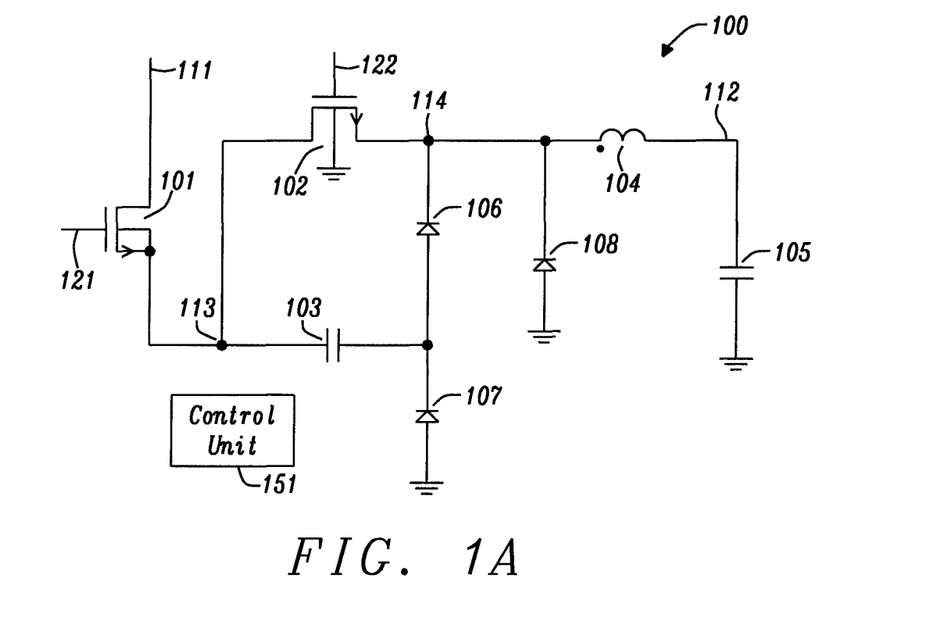
FIG. 1A shows a circuit diagram of an example step-down power converter.

FIG. 1A shows a circuit diagram of a (step-down or buck) power converter 100, which is configured to convert an input voltage Vin at an input port 111 into an output voltage Vout at an output port 112. The power converter 100 comprises a first switch 101 (e.g. a metaloxide semiconductor, MOS, transistor) and a second switch 102 (e.g. a MOS transistor). A first node (e.g. the source or drain) of the first switch 101 is directly coupled to the input port 111, and a second node (e.g. the drain or source) of the first switch 102 is directly coupled to a first node (e.g. the source or drain) of the second switch 102. A second node (e.g. the drain or source) of the second switch 102 is directly coupled to an inductor 104 of the power converter 100, wherein the inductor 104 is coupled to the output port 112.

The power converter 100 comprises a serial arrangement of diodes 106, 107 (also referred to herein as diode elements), which are arranged between the second node of the second switch 102 and a reference port (e.g. ground). In addition, the power converter 100 comprises a capacitor 103, which is arranged between the second node of the first switch 101 and the midpoint between the first diode 106 and the second diode 107.

In addition, the power converter 100 may comprise an output capacitor 105, which is arranged between the output port 112 and the reference port. The output capacitor 105 is configured to smoothen voltage variations at the output port 112. Furthermore, the power converter 100 may comprise a (third) diode 108 arranged between the second node of the second switch 102 and the reference port.

Hence, the power converter 100 comprises an LC tank (comprising the capacitor 103 and the inductor 104, which are arranged in series), in order to transfer power from the input port 111 to the output port 112. The timing for controlling the switches 101, 102 may depend on the time constant of the LC tank, i.e. the timing may depend on the inductance L of the inductor 104 and/or on the capacitance C of the capacitor 103.

The power converter 100 may be operated in two operation states, wherein the operation states may be controlled using the control signals 121, 122, which are applied to the gates or control nodes of the switches 101, 102. During a first operation state, the first switch 101 is on and the second switch 102 is off. When the first switch 101 is turned on, current flows from the input port 111 to the capacitor 103, through the (forward biased) first diode 106, through the inductor 104 to the output port 112. Once the capacitor 103 is charged to the input voltage Vin, the current flow stops. Hence, the waveform of the input current (at the input port 111) corresponds to a half sinusoid.

During the second operation state, the energy, which is stored within the capacitor 103, is provided to the output port 112. During the second state the first switch 101 is off, and the second switch 102 is turned on. As a result of this, current flows from the reference port through the second diode 107, through the capacitor 103, through the second switch 102, through the inductor 104 to the output node 112. No current is provided from this input port 111 during the second operation state.

The power converter 100 may be controlled by alternating the first operation state and the second operation state during a sequence of cycles. Each cycle may comprise a (single) first time interval, during which the power converter 100 is in the first operation state, and a (single) second time interval, during which the power converter 100 is in the second operation state. The cycles may or may not be repeated at a cycle rate, wherein the cycle rate typically depends on the output load current, the input voltage, the output voltage and/or the temperature.

Figure 1B:
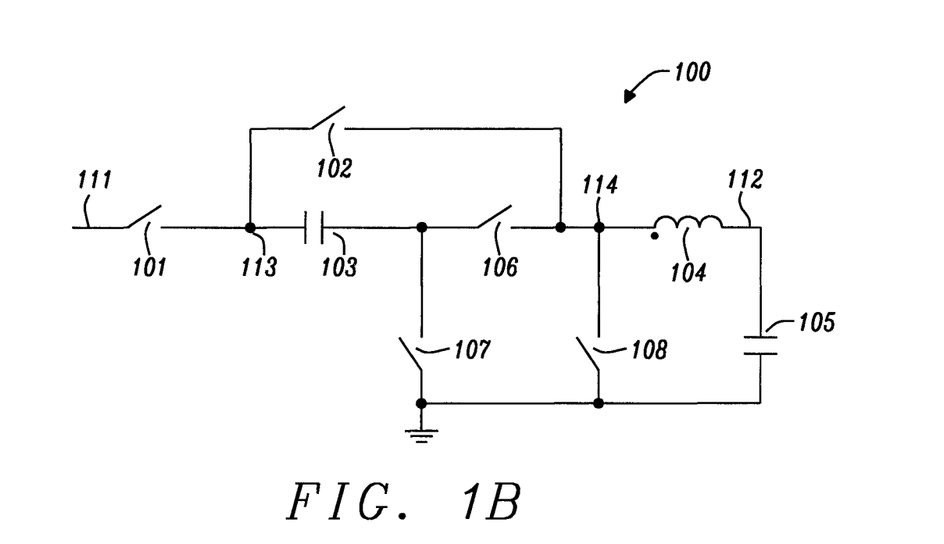
FIG. 1B shows a further circuit diagram of an example step-down power converter.

FIG. 1B shows a further circuit diagram of a power converter 100, wherein FIG. 1B explicitly indicates that the diodes 106, 107, 108 may be implemented using active diodes and/or switches.

It should be noted that the switches 101, 102, 106, 107, 108 of the power converter 100 may be implemented using MOS transistors, notably optimised MOS transistors. Alternatively, or in addition, the switches 101, 102, 106, 107, 108 may (each) be implemented by a cascode of a high voltage switch and a low voltage switch, where the low voltage switch may be driven from the output of the converter 100 for improved efficiency.

Figure 2:
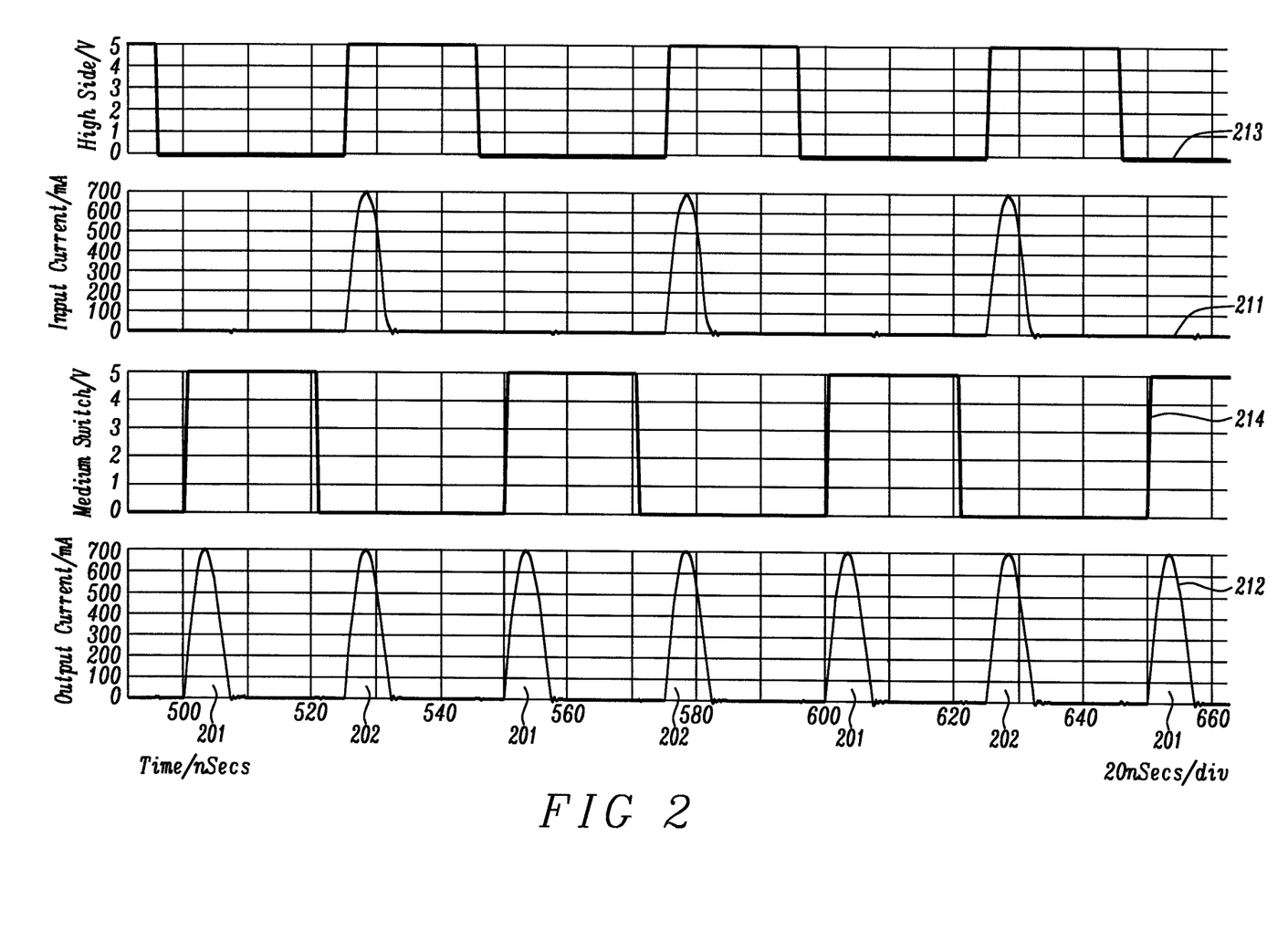
FIG. 2 shows an example output current of the power converter of FIGS. 1A and 1B.

FIG. 2 shows the output current 212 provided at the output port 112 of the power converter as a function of time t. It can be seen that the output current 212 comprises a half sinusoid for each first operation state 201 and for each second operation state 202. The output current 212 is drawn from the input port 111 (e.g. from a battery or a supply attached to the input port 111) when the power converter 100 is in the first operation state 201. This can be seen from the input current 211 which is also shown in FIG. 2. On the other hand, no current is drawn from the input port 111 when the power converter 100 is in the second operation state 202. Furthermore, FIG. 2 illustrates an example control signal 121 for the first switch 101 (reference numeral 213) and an example control signal 122 for the second switch 102 (reference numeral 214).

It should be noted that in contrast to other switched-mode power converter topologies, the topology shown in FIGS. 1A and 1B does not require a first operation state 201 to be followed directly by a second operation state 202. Alternatively, or in addition, the duration of subsequent cycles may be varied, depending on the current and/or energy needs at the output port 112. If the energy need at the output port 112 is fulfilled by the first operation state 201, the second operation state 202 does not need to be initiated. The energy remains stored in the capacitor 103 and when energy is again requested at the output port 112, an energy transfer using the second operation state 202 may be initiated.

In order to provide a power converter 100 having relatively high efficiency, the diodes 106, 107, 108 are preferably implemented using switches (notably transistors) and/or active diodes. Alternatively, or in addition, zero voltage switching (ZVS) may be implemented for the first switch 101. This may be achieved in a reliable manner by operating the power converter 100 such that the first operation state 201 is directly followed by the second operation state 202. Hence, it may be beneficial to operate the power converter 100 repeatedly using alternating first and second operation states 201, 202, notably for low power circuits.

Figure 3:
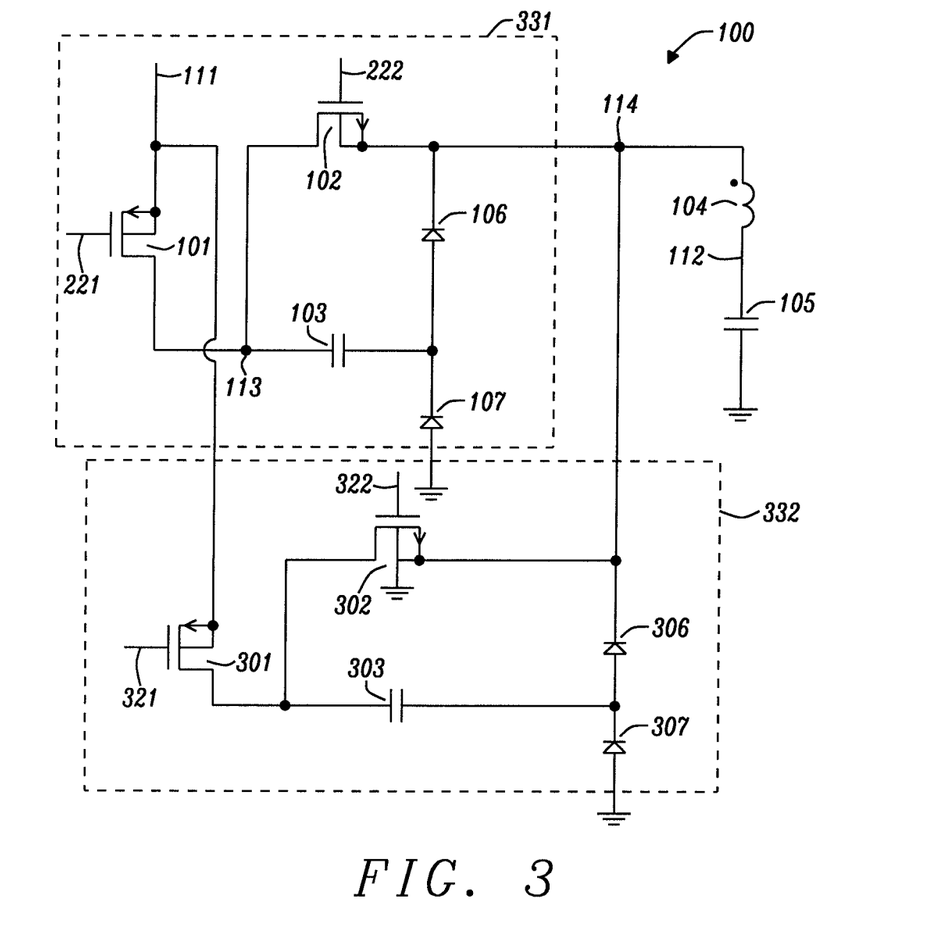
FIG. 3 shows a circuit diagram of an example multi-phase power converter.

FIG. 3 shows a power converter 100 comprising multiple phases 331, 332 in conjunction with a single inductor 104. The power converter 100 comprises a first phase 331 comprising a first set of switches 101, 102, a first capacitor 103 and a first arrangement of diodes 106, 107. Furthermore, the power converter 100 comprises a second phase 332 which is arranged in parallel to the first phase 331 and which is designed in the same manner as the first phase 331, comprising a second set of switches 301, 302, a second capacitor 303 and a second arrangement of diodes 306, 307.

The different phases 331, 332 of the power converter 100 are preferably operated in a phase-shifted or time-shifted manner with respect to one another, in order to reduce the ripple current within the inductor 104. Hence, the control signals 221, 222 of the first phase 331 and the control signals 321, 322 of the second phase 332 may be phase-shifted with respect to one another. In particular, the first phase 331 may be operated in the first operation state 201, and subsequently or delayed, the second phase 332 may be operated in the first operation state 201. Subsequently, the first phase 331 may be operated in the second operation state 202, and subsequently or delayed, the second phase 332 may be operated in the second operation state 202.

Figure 4:
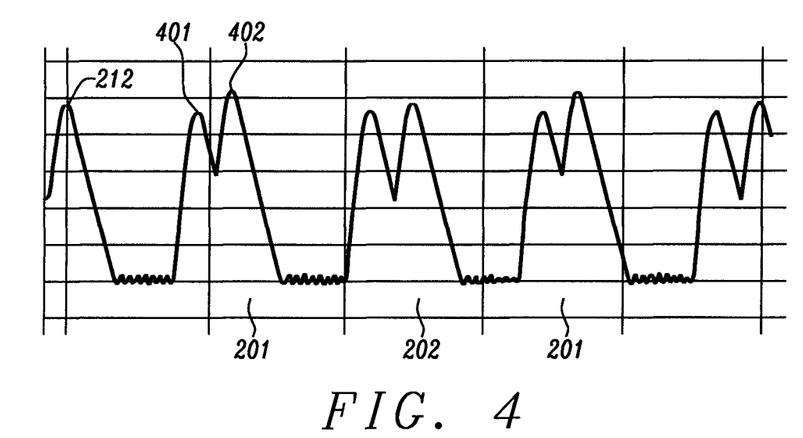
FIG. 4 shows an example output current of the power converter of FIG. 3.

FIG. 4 shows the output current 212 of the multi-phase power converter 100 of FIG. 3. The output current 212 comprises a succession of first peaks 401 corresponding to operation of the first phase 331 and second peaks 402 corresponding to operation of the second phase 332. It can be seen that by increasing the number of phases 331, 332 and/or by increasing the cycle rate and/or the repetition frequency, the ripple of the output current 212 can be reduced.

Figure 5:
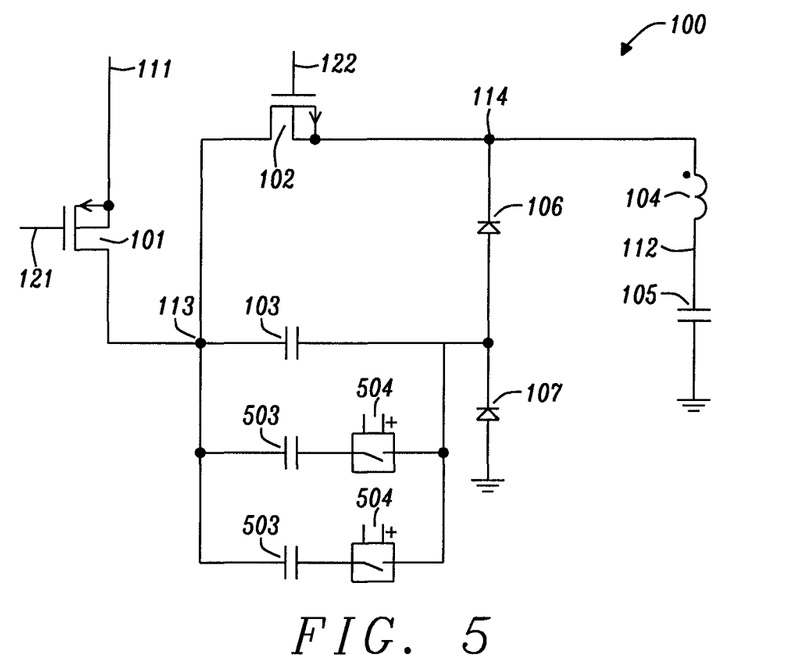
FIG. 5 shows a circuit diagram of an example power converter comprising an adjustable capacitor.

FIG. 5 shows a power converter 100 which comprises a capacitor 103 having an adaptable capacitance C. In the illustrated example, the capacitance of the capacitor 103 may be adapted by arranging one or more additional capacitors 503 in parallel to the capacitor 103 using switches 504. The capacitance may e.g. be varied between 100 pF and 500 pF (if integrated in silicon). The one or more capacitors 103, 503 may be implemented as on-chip capacitors.

Figure 6:
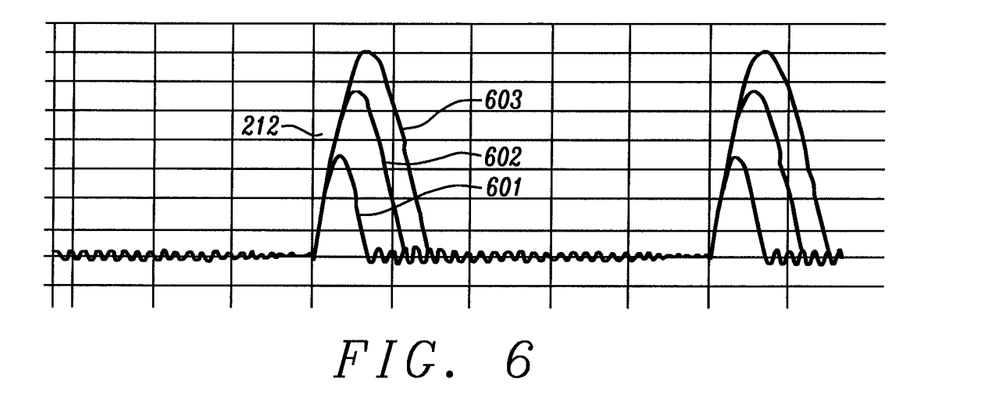
FIG. 6 shows an example output current for the power converter of FIG. 5.

FIG. 6 illustrates the output current 212 for the different capacitor values. It can be seen that the current peaks 601, 602, 603 increase with increasing capacitor values or capacitance C.

The power converter 100 comprises a control unit 151 which is configured to operate the power converter 100, notably the switches 101, 102 of the power converter 100, in dependence of the output voltage Vout at the output port 112, e.g. in order to regulate the output voltage to a target voltage. The regulation may be performed by

- adapting the repeating frequency and/or the cycle rate of a cycle comprising the first and the second operation states 201, 202;
- activating and/or deactivating one or more phases 331, 332 of the power converter 100; and/or
- adapting the capacitance of the one or more capacitors 103 of the power converter 100.

Figure 7:
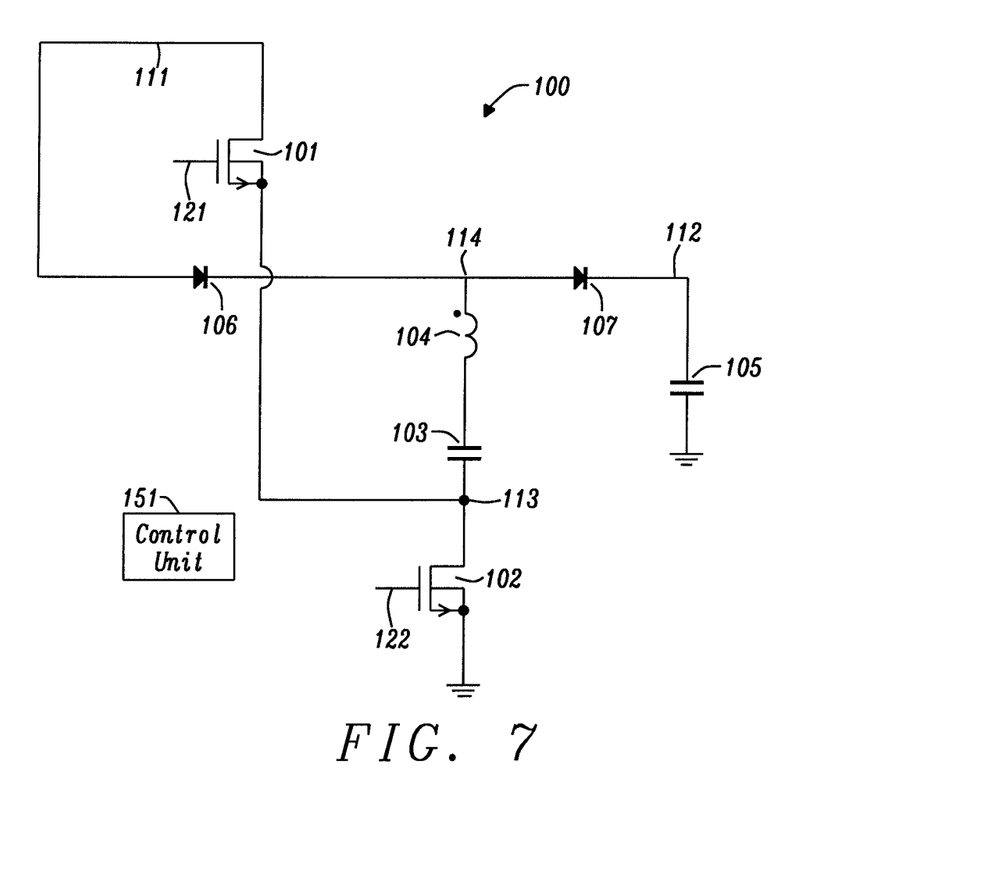
FIG. 7 shows a circuit diagram of an example step-up power converter.

FIG. 7 shows a circuit diagram of a step-up or boost power converter 100. The power converter 100 comprises a first switch 101 having a first node that is directly coupled to the input port 111 and having a second node which is directly coupled to the first node of the second switch 102. The second node of the second switch 102 is directly coupled to the reference port (e.g. ground). Furthermore, the second node of the first switch 101 is directly coupled to the capacitor 103 which is arranged in series with the inductor 104.

Furthermore, the power converter 100 of FIG. 7 comprises a first diode 106 which is directly coupled to the input port 111 and which is directly followed by a second diode 107, which is directly coupled to the output port 112. The inductor 104 is directly coupled to the midpoint 114 between the first diode 106 and the second diode 107.

The power converter 100 of FIG. 7 may be operated in a first operation state, during which the first switch 101 is off and during which the second switch 102 is on. As a result of this, current is flowing from the input port 111, through the first diode 106, through the inductor 104, through the capacitor 103, through the second switch 102 to the reference port, as well as from the input port 111, through the first diode 106, through the second diode 107 to the output port 112. During the first operation state energy is stored in the inductor 104 and in the capacitor 103.

Furthermore, the power converter 100 of FIG. 7 may be operated in a second operation state, during which the first switch 101 is on and during which the second switch 102 is off. During this state, the first diode 106 is reverse biased. Current is flowing from the input port 111 through the first switch 101, through the capacitor 103, through the inductor 104, through the second diode 107 to the output port 112.

The power converter 100 may be operated in an alternating manner in the first operation state and in the second operation state (as outlined above for the step-down power converter 100).

Hence, a DC-DC converter topology is described. The DC-DC power converter 100 comprises a capacitor 103 arranged in series with an inductor 104, which may be separated by a unidirectional switch (i.e. the first diode 106) to enable energy transfer in only one direction. The power converter 100 may make use of a multi-phase implementation using only a single inductor 104. Alternatively, or in addition, one or more additional capacitive storage elements 503 parallel to the first capacitor 103 may be used.

Furthermore, a method for driving a dc-dc converter topology under low load is described. Using a high-side switch 101, a current flow via the internal capacitor 103 to the output port 112 is enabled, thereby charging the capacitor 103 and reducing the inductor current through the inductor 104 to zero. As a result of this, the low-side switch 102 does not need to be enabled. Hence, a reduced amount of charge may be delivered to the output port 112, thereby leading to reduced ripple.

For improved efficiency, the turn-on of the low side switch 102 may be followed by the turn-on of the high side switch 101. As a result of this, ZVS may be achieved for the high-side switch 101.

In particular, the following aspects have been described:
- A buck topology to achieve a relatively large conversion ratio without the need for a tight control on timing of the high-side switch 101 and/or the other switches;
- A buck topology for which a multiphase scheme can be implemented using a single inductor 104;
- A buck topology for which the maximum input current may be limited by the value of the capacitor 103 and/or the inductor 104;
- A switching topology for which the timing for the switch control may be defined by the inductor value and/or the capacitor value;

A buck topology for which a turn-on of the low-side switch 102 does not have to immediately follow a turn-on of the high-side switch 101;

A buck topology for which energy can be stored within the power converter 100;

A buck topology for which energy stored within the power converter 100 may be provided on demand, if the output port 112 requests energy; possibly no energy needs to be provided from the input port 111; and/or A switching topology capable of operating with inductor and capacitor values that can be implemented on die, and/or which exhibit relaxed timing control for the switches 101, 102.

The LC tank of the power converter 100 may have the function of a $2^{nd}$ order filter at the output of the power converter 100. This filter may be converted to a fourth order filter by splitting the inductor 104 into two separate inductors and by adding an additional capacitor at the mid-point between the inductors. By doing this, the ripple current at the output port 112 can be further reduced.

Hence, a (DC-DC) power converter 100 configured to provide energy at an output port 112 based on energy provided at an input port 111 is described. The power converter 100 may be configured to perform step-down conversion, such that the output voltage at the output port 112 is smaller than the input voltage at the input port 111. The input port 111 and/or the output port 112 may be operated relative to the reference port. In particular, the input voltage and/or the output voltage may be indicated relative to the reference potential at the reference port (e.g. ground). The power converter 100 may be designed as shown in FIG. 1A, 1B, 3, or 5.

The power converter 100 comprises a first switch 101, wherein a first node of the first switch 101 is (directly) coupled to the input port 111 and wherein a second node of the first switch 101 is (directly) coupled to an intermediate point 113. Furthermore, the power converter 100 comprises a second switch 102, wherein a first node of the second switch 102 is (directly) coupled to the intermediate point 113 and wherein a second node of the second switch 102 is (directly) coupled to an inductor point 114. The switches 101, 102 may be MOS transistors.

In addition, the power converter 100 comprises a capacitor 103, wherein a first node of the capacitor 103 is (directly) coupled to the intermediate point 113.

Furthermore, the power converter 100 comprises a first diode element 106, wherein a first node of the first diode element 106 is (directly) coupled to a second node of the capacitor 103 and wherein a second node of the first diode element 106 is (directly) coupled to the inductor point 114. The first diode element 106 may be configured to enable a current from the first node to the second node, and to block a current from the second node to the first node. The first diode element 106 may be implemented using one or more switches which are operated to provide a diode function.

Furthermore, the power converter 100 comprises a second diode element 107, wherein a first node of the second diode element 107 is (directly) coupled to the reference port, and wherein a second node of the second diode element 107 is (directly) coupled to the second node of the capacitor 103. The second diode element 107 may be configured to enable a current from the first node to the second node, and to block a current from the second node to the first node. The second diode element 107 may be implemented using one or more switches, which are operated to provide a diode function.

In addition, the power converter 100 comprises a (single) inductor 104, wherein a first node of the inductor 104 is (directly) coupled to the inductor point 114 and wherein a second node of the inductor 104 is (directly) coupled to the output port 112.

Hence, a power converter 100 is described which comprises a serial arrangement of an inductor 104 and a capacitor 103, thereby enabling relatively large voltage conversion ratios in an efficient manner.

The power converter 100 may comprise a control unit 151 which is configured to operate the power converter 100 in different operation states (or operation modes) 201, 202 to provide (regulated) power at the output port 112. The plurality of different operation states 201, 202 may comprise a first operation state 201, wherein within the first operation state 201 the first switch 101 is closed or ON and the second switch 102 is open or OFF. Furthermore, the plurality of different operation states 201, 202 may comprise a second operation state 202, wherein within the second operation state 202 the first switch 101 is open or OFF and the second switch 102 is closed or ON. The use of these operation states 201, 202 enables the provision of power in a flexible and efficient manner.

The control unit 151 may be configured to detect that energy is requested at the output port 112. This may be detected e.g. due to a drop of the output voltage at the output port 112 (e.g. because the output voltage falls below a pre-determined lower voltage threshold). In reaction to this, the power converter 100 may be operated in the first operation state 201, to provide energy (directly) from the input port 111 to the output port 112, and to charge energy from the input port 111 to the capacitor 103. As a result of this, power may be provided in a rapid manner.

The control unit 151 may be configured to detect that no further energy is required at the output port 112, while the power converter 100 is operated in the first operation state 201. This may be detected e.g. due to a rise of the output voltage at the output port 112 (e.g. because the output voltage rises above a pre-determined upper voltage threshold). In reaction to this, the power converter 100 may be maintained in the first operation state 201 and/or further operation of the power converter 100 in the second operation state 202 may be suspended. In other words, the stored energy within the capacitor 103 may be maintained within the capacitor 103, without the need for continuing operation of the power converter 100 with the second operation state 202. By doing this, the flexibility and efficiency of the power converter 100 may be increased.

The control unit 151 may be configured to detect that energy is requested at the output port 112. This may be detected e.g. due to a drop of the output voltage at the output port 112 (e.g. because the output voltage falls below a pre-determined lower voltage threshold). Furthermore, it may be determined that the power converter 100 has (previously) been and/or is being operated in the first operation state 201. In other words, it may be determined that the capacitor 103 is charged. In reaction to this, the power converter 100 may be operated in the second operation state 202, to provide energy stored within the capacitor 103 to the output port 112. Hence, energy may be provided to the output port 112 in a flexible and efficient manner.

The first switch 101, the second switch 102, the capacitor 103, the first diode element 106 and the second diode element 107 may form a phase 331 of the power converter 100, wherein the phase 331 is arranged between the input port 111 and the inductor point 114. The power converter 100 may comprise a plurality of different phases 331, 332, which are arranged in parallel to one another between the input port 111 and the inductor point 114. The different phases 331, 332 may each comprise a respective first switch 101, 301, a respective second switch 102, 302, a respective capacitor 103, 303, a respective first diode element 106, 306 and a respective second diode element 107, 307. The different phases 331, 332 may exhibit the same structure. Hence, a multi-phase power converter 100 may be provided.

The multi-phase power converter 100 may comprise only a single inductor 104 and/or a joint inductor 104 between the inductor point 114 and the output port 112 for the plurality of different phases 331, 332, thereby providing an efficient power converter 100 with reduced current ripple.

The control unit 151 may be configured to operate the plurality of different phases 331, 332 phase-shifted with respect to one another, such that peaks of output currents 212 provided by the different phases 332, 332 at the output port 112 are distributed over time and/or do not coincide. By doing this, the current ripple at the output port 112 may be reduced.

The capacitance value of the capacitor 103 may be adjustable (e.g. using a matrix of capacitors 103, 503, as shown in FIG. 5). The control unit 151 may be configured to adapt the capacitance value of the capacitor 103 during operation of the power converter 100, thereby further increasing the flexibility and/or the efficiency of the power converter 100.

The control unit 151 may be configured to determine a voltage indication of the output voltage of the energy provided at the output port 112. The voltage indication may be determined using voltage sensing means (e.g. a voltage divider). The control unit 151 may be configured to operate the power converter 100 in dependence of the voltage indication, notably to regulate the output voltage to a target voltage. By doing this, a regulated output voltage may be provided for supplying electrical power to one or more devices at the output port 112.

In particular, the control unit 151 may be configured to adapt the cycle rate for repeating a cycle comprising a plurality of different operation states of the power converter 100 in dependence of the voltage indication. Alternatively, or in addition, the control unit 151 may be configured to adapt the number of active phases 331, 332 from a plurality of different phases 331, 332 of the power converter 100 in dependence of the voltage indication. Alternatively, or in addition, the control unit 151 may be configured to adapt the capacitance value of the capacitor 103 in dependence of the voltage indication.

Hence, the power converter 100 may be adapted in various different manners to provide a precise regulation of the output voltage.

The control unit 151 may be configured to set one or more succeeding time instants for changing between different operation states 201, 202 in dependence of a time constant which depends on the capacitance C of the capacitor 103 and the inductance L of the inductor 104, notably on L*C. By doing this, an efficient power conversion may be provided.

The power converter 100 may comprise an LC filter arranged between the inductor 104 and the output port 112. The LC filter may comprise a filter inductor and a filter capacitor, wherein the filter inductor is arranged in series with the inductor of the power converter and wherein the filter capacitor is arranged to couple the midpoint between the inductor and the filter inductor to the reference port. The total inductance of the power converter may be provided by the sum of the inductance of the inductor and the filter inductor.

In particular, the power converter 100 may comprise an output capacitor 105, which is coupled to the output port 112. The output capacitor 105 and the inductor 104 may be split up in several partial capacitors and several partial inductors to form a fourth or higher order output filter. By making use of an LC filter, the ripple of the output current may be reduced.

As indicated above, the first diode element 106, the second diode element 107 and/or the third diode element 108 may each be implemented using one or more switches. In this case, the power converter 100 may be adapted to provide relatively low power conversion ratios (e.g. between 1 and 0.5) in an efficient manner. In particular, the first diode element 106 and the second diode element 107 may be maintained open. Furthermore, the second switch 102 may be maintained closed. The first switch 101 and the third diode element 108 (being implemented using a switch) may then be operated to provide a switched-mode power converter.

Hence, the first diode element 106 may be implemented using a switch, and the second diode element 107 may be implemented using a switch. As outlined above, the power converter 100 may comprises a third diode element 108, which is configured to couple the inductor point 114 to the reference port. The third diode element 108 may be forward biased in the direction from the reference port to the inductor port 114. The third diode element 108 may also be implemented using a switch.

In order to provide relatively low conversion ratios, the control unit 151 may be configured to maintain the first diode element 106 and the second diode element 107 open, and maintain the second switch 102 closed. Furthermore, the control unit 151 may be configured to perform power conversion between the input port 111 and the output port 112 by alternatingly switching on and off the first switch 101 and the third diode element 108. Hence, the power converter 100 may also be used for relatively low power conversion ratios.

In addition, a power converter 100 (notably a step-up or boost power converter) configured to provide energy at an output port 112 based on energy provided at an input port 111 is described. The aspects and/or functions described for the (step-down) power converter 100 are also applicable to the (step-up) power converter 100. An example step-up power converter 100 is shown in FIG. 7.

The power converter 100 comprises a first switch 101, wherein a first node of the first switch 101 is (directly) coupled to the input port 111 and wherein a second node of the first switch 101 is (directly) coupled to an intermediate point 113. Furthermore, the power converter 100 comprises a second switch 102, wherein a first node of the second switch 102 is (directly) coupled to the intermediate point 113 and wherein a second node of the second switch 102 is (directly) coupled to a reference port.

In addition, the power converter 100 comprises a capacitor 103, wherein a first node of the capacitor 103 is (directly) coupled to the intermediate point 113.

The power converter 100 further comprises a first diode element 106, wherein a first node of the first diode element 106 is (directly) coupled to the input port 111 and wherein a second node of the first diode element 106 is (directly) coupled to the inductor point 114. In addition, the power converter 100 comprises a second diode element 107, wherein a first node of the second diode element 107 is (directly) coupled to the inductor point 114, and wherein a second node of the second diode element 107 is (directly) coupled to the output port 112.

Furthermore, the power converter 100 comprises an inductor 104, wherein a first node of the inductor 104 is (directly) coupled to a second node of the capacitor 103 and wherein a second node of the inductor 104 is (directly) coupled to the inductor point 114.

Figure 8:
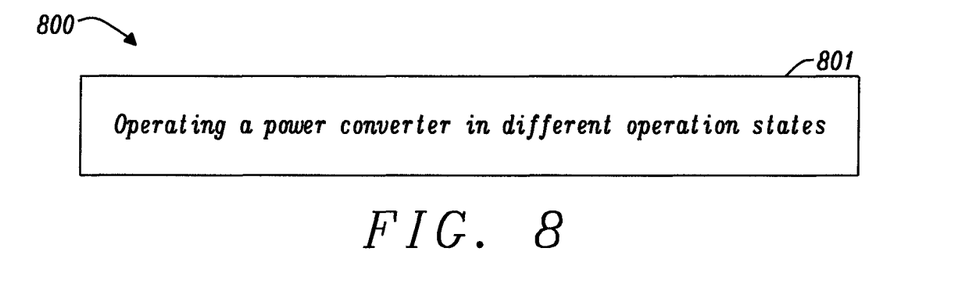
FIG. 8 shows a flow chart of an example method for operating a power converter.

FIG. 8 shows a flow chart of an example method 800 for operating a power converter 100 described in the present document. The method 800 comprises 801, operating the power converter 100 in different operation states 201, 202, notably to provide power at the output port 112 at a regulated output voltage.

Furthermore, a method provides energy at an output port 112 of a power converter 100 based on energy provided at an input port 111 of the power converter 100. The power converter 100 may comprise one or more of the components described in the present document. In particular, the power converter 100 may be designed as described in the context of FIGS. 1A and 1B.

The method comprises, in a first operating state 201 of the power converter 100, closing the first switch 101 which is arranged between the input port 111 and a capacitor 103 of the power converter 100, to at least partially charge the capacitor 103. Furthermore, the method may comprise, in the first operation state 201, opening the second switch 102, which is arranged between the capacitor 103 and an inductor 104 of the power converter 100, wherein the inductor 104 is coupled to the output port 112, to decouple the capacitor 103 from the output port 112.

In addition, the method may comprise, in a subsequent second operation state 202 of the power converter 100, opening the first switch 101 to decouple the capacitor 103 from the input port 111, and closing the second switch 102 to at least partially discharge the capacitor 103 via the inductor 104 to the output port 112.

The current waveform at the input and the output of the power converter 100 may be half sinusoid or an overlay of a plurality of half sinusoids (in case of a multi-phase power converter 100) as illustrated in FIGS. 2, 4 and 6. The peak of the input current pulses may vary as the load at the output port 112 increases.

The power converter 100 described in the present document may be used within an LDO (low-drop out) voltage regulator. As a result, relatively high power efficiency with a relatively high voltage conversion ratio may be achieved (e.g. 60% efficiency for Vin of 5V and Vout of 1V). Furthermore, EMI requirements may be reduced.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A buck converter configured to provide energy at an output port based on energy provided at an input port; wherein the buck converter comprises,
    a first switch, wherein a first node of the first switch is coupled to the input port and wherein a second node of the first switch is coupled to an intermediate point;
    a second switch, wherein a first node of the second switch is coupled to the intermediate point and wherein a second node of the second switch is coupled to an inductor point;
    a capacitor, wherein a first node of the capacitor is coupled to the intermediate point;
    a first diode element, wherein a first node of the first diode element is coupled to a second node of the capacitor and wherein a second node of the first diode element is coupled to the inductor point;
    a second diode element, wherein a first node of the second diode element is coupled to a reference port, and wherein a second node of the second diode element is coupled to the second node of the capacitor; and
    an inductor, wherein a first node of the inductor is coupled to the inductor point and wherein a second node of the inductor is coupled to the output port.

2. The buck converter of claim 1, wherein
    the buck converter comprises a control unit; and
    the control unit is configured to operate the buck converter in different operation states to provide power at the output port.

3. The buck converter of claim 2, wherein
    the control unit is configured to operate the buck converter in a first operation state; and
    within the first operation state the first switch is closed or ON and the second switch is open or OFF.

4. The buck converter of claim 2, wherein
    the control unit is configured to operate the buck converter in a second operation state; and
    within the second operation state the first switch is open or OFF and the second switch is closed or ON.

5. The buck converter of claim 3, wherein the control unit is configured to
    detect that energy is requested at the output port; and
    operate the buck converter in the first operation state, to provide energy from the input port to the output port, and to charge energy from the input port to the capacitor.

6. The buck converter of claim 5, wherein the control unit is configured to
    detect that no further energy is required at the output port, while the buck converter is operated in the first operation state; and
    maintain the buck converter in the first operation state and/or suspend operating the buck converter in the second operation state.

7. The buck converter of claim 3, wherein the control unit is configured to
    detect that energy is requested at the output port; and
    determine that the buck converter has been and/or is being operated in the first operation state; and
    operate the buck converter in the second operation state, to provide energy stored within the capacitor to the output port.

8. The buck converter of claim 2, wherein the control unit is configured to
    determine a voltage indication of an output voltage of the energy provided at the output port; and
    operate the buck converter in dependence of the voltage indication, to regulate the output voltage to a target voltage.

9. The buck converter of claim 8, wherein the control unit is configured to
    adapt a cycle rate for repeating a cycle comprising a plurality of different operation states of the buck converter;

adapt a number of active phases from a plurality of different phases of the buck converter; and/or adapt a capacitance value of the capacitor in dependence of the voltage indication.

10. The buck converter of claim 2, wherein the control unit is configured to set one or more succeeding time instants for changing between different operation states in dependence of a time constant, which depends on a capacitance of the capacitor and an inductance of the inductor.

11. The buck converter of claim 1, wherein the first switch, the second switch, the capacitor, the first diode element and the second diode element form a phase of the buck converter, which is arranged between the input port and the inductor point; and the buck converter comprises a plurality of phases, which are arranged in parallel to one another between the input port and the inductor point.

12. The buck converter of claim 11, wherein the buck converter comprises only a single inductor and/or a joint inductor between the inductor point and the output port for the plurality of different phases.

13. The buck converter of claim 11; wherein the buck converter comprises a control unit; and the control unit is configured to operate the plurality of different phases phase-shifted with respect to one another, such that peaks of output currents provided by the different phases at the output port are distributed over time and/or do not coincide.

14. The buck converter of claim 1, wherein a capacitance value of the capacitor is adjustable; and the buck converter comprises a control unit configured to adapt the capacitance value of the capacitor during operation of the buck converter.

15. The buck converter of claim 1, wherein the first diode element and/or the second diode element are configured to enable a current from the respective first node to the respective second node, and to block a current from the respective second node to the respective first node; and/or the first diode element and/or the second diode element are implemented using one or more switches which are operated to provide a diode function.

16. The buck converter of claim 1, wherein the buck converter comprises an output capacitor which is coupled to the output port; and the output capacitor and the inductor are split up in several partial capacitors and several partial inductors to form a fourth or higher order output filter.

17. The buck converter of claim 1, wherein the first diode element is implemented using a switch;

the second diode element is implemented using a switch;

the buck converter comprises a third diode element which is configured to couple the inductor point to the reference port; wherein the third diode element is implemented using a switch;

the buck converter comprises a control unit; and the control unit is configured to maintain the first diode element and the second diode element open;

maintain the second switch closed;

perform power conversion between the input port and the output port by alternatingly switching on and off the first switch and the third diode element.

18. A method for operating a buck converter according to claim 1; wherein the method comprises, operating the buck converter in different operation states to provide power at the output port at a regulated output voltage.

* * * * *